United States Patent [19]

Storace et al.

[11] 3,951,257

[45] Apr. 20, 1976

[54] MAIL TRANSPORTING MECHANISM

[75] Inventors: Anthony Storace, Tarrytown, N.Y.; Paul R. Sette, Hamden, Conn.

[73] Assignee: Pitney-Bowes, Inc., Stamford, Conn.

[22] Filed: Oct. 30, 1974

[21] Appl. No.: 519,090

[52] U.S. Cl. ........................... 198/208; 74/242.1 R; 74/242.15 R; 198/165
[51] Int. Cl.[2] .................. B65G 23/44; B65G 15/14
[58] Field of Search .......... 198/165, 137, 208, 204, 198/134, 160, 162, DIG. 16; 226/170, 171; 74/241.1 R, 242.1 TA, 242.8, 242.11 R, 242.11 C, 242.11 P, 242.12, 242.15 R; 254/135 R

[56] References Cited
UNITED STATES PATENTS

| | | | |
|---|---|---|---|
| 1,230,718 | 6/1917 | Kamp | 74/242.1 R X |
| 1,367,306 | 2/1921 | Brun | 74/242.1 R X |
| 1,557,486 | 10/1925 | Valentine | 74/242.11 R |
| 2,372,646 | 4/1945 | Barnby | 198/165 |
| 2,941,653 | 6/1960 | Kriemelmeyer | 198/165 X |
| 3,262,330 | 7/1966 | Cheatum | 74/242.11 R X |
| 3,272,026 | 9/1966 | Hale | 74/242.11 R |
| 3,326,353 | 6/1967 | Murchison | 198/165 |
| 3,374,686 | 3/1968 | Brewer | 74/242.11 R |
| 3,550,463 | 12/1970 | Halls | 74/242.1 R X |
| 3,738,189 | 6/1973 | Chen | 74/242.15 R |

FOREIGN PATENTS OR APPLICATIONS

| | | | |
|---|---|---|---|
| 783,434 | 4/1968 | Canada | 198/DIG. 16 |

*Primary Examiner*—Evon C. Blunk
*Assistant Examiner*—James L. Rowland
*Attorney, Agent, or Firm*—William D. Soltow, Jr.; Albert W. Scribner; Robert S. Salzman

[57] ABSTRACT

A mail transporting mechanism for transporting pieces of mail through a mail handling system. The mechanism comprises a frame supporting a number of rotative rollers. A friction belt is stretched over the rollers, and conveys a letter through the mechanism as the rollers turn. The rollers are mounted on a movable yoke assembly, which is spring biased to provide positive contact between the belt and the mail. The roller assemblies are pivotable from an engaging position to a non-engaging position, by means of a slidable bar carried on the frame. When the bar is made to slide, a bracket fixed to each of the roller assemblies is made to pivotably cam causing the roller assembly to disengage. The bracket has means for easily setting the engaged position of the assembly to a given level of contact with the mail.

9 Claims, 6 Drawing Figures

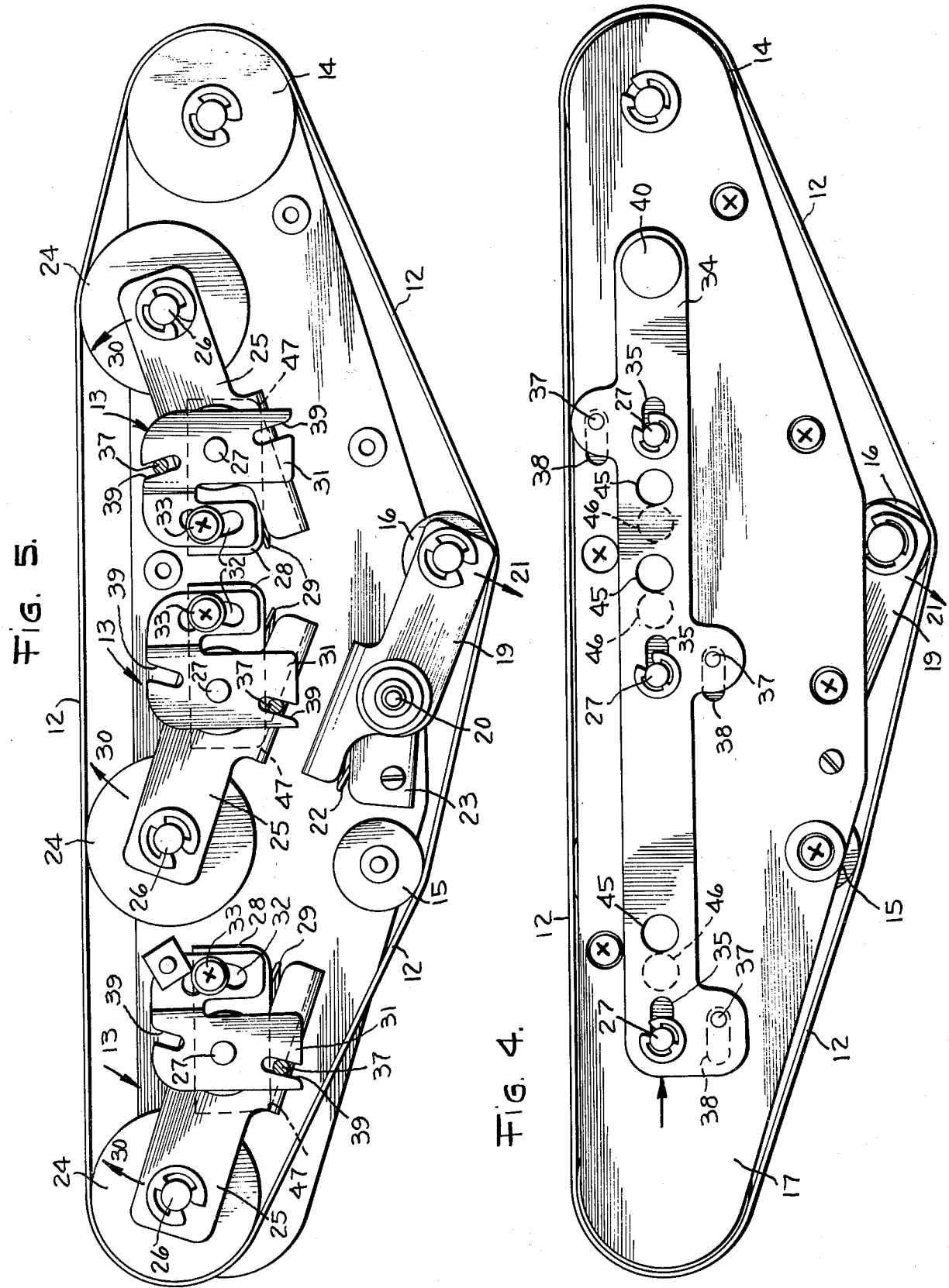

MAIL TRANSPORTING MECHANISM

This invention relates to a mail transporting mechanism, and more particularly to a mail transporting mechanism for moving pieces of mail having a vertical orientation through a mail-handling system.

BACKGROUND OF THE INVENTION AND RELATED APPLICATIONS

In recent times, new ways have been sought to transport mail at higher speeds and with increased efficiency.

In order to achieve high mailing speeds, it has been determined that pieces of mail should be transported with a vertical orientation (please refer to patent application, Ser. No. 476,618, filed: June 5, 1974). Therefore, there is need for a transporting device which will be able to handle vertically oriented mail.

In addition, there is a further need to provide mail transporting equipment, which provides easy access and maintenance in the event of jamming or inoperability. The mechanism should also be easily adjustable to a proper engagement setting.

The subject inventive mail transporting mechanism has been designed to accomplish the aforementioned objectives.

SUMMARY OF THE INVENTION

This invention is for a mail transporting mechanism, which is capable of easily being released to free jammed envelopes, and which can be quickly and easily adjusted to an operatively calibrated setting. The mechanism comprises a frame housing a plurality of roller assemblies each having a rotatively mounted roller upon a pivotable yoke member. A spring is disposed between each yoke member and an adjacent associated support collar, so as to bias the yoke member and roller towards a mail engaging position. A bracket carried by each of the roller assemblies is pivotable about the same shaft supporting each yoke member. On one end of each bracket is a curved slot, and a set screw for adjustably affixing the bracket to the support collar. The bracket position influences the engaging position of the roller assembly with respect to the frame.

A slide bar carried by the frame contains a number of pins, one pin for each bracket. When the bar is made to slide, the pins cause the brackets to pivot, which in turn, causes each roller assembly to pivot from a mail engaging position to a non-engaging mail position. A belt for conveying pieces of mail is stretched over the rollers of the roller assemblies. When the roller assemblies are caused to pivot to a non-engaging mail position, the belt is easily removed from the rollers. This is useful for replacing worn or frayed conveyor belts, or for freeing jammed envelopes from between the rollers.

It is an object of this invention to provide an improved mail transporting mechanism;

It is another object of the invention to provide a mail transporting mechanism which has a novel jam release device for performing quick maintenance and repair;

It is still another object of this invention to provide a mail transporting mechanism which is quickly and easily calibrated.

These and other objects of the invention will become more apparent, and will be better understood with reference to the following detailed description, taken in conjunction with the accompanying drawings, in which:

FIG. 4 shows a top view of the mail transporting mechanism of FIG. 1 in a non-engaging mail position;

FIG. 5 depicts a top view of the mail transporting mechanism of FIG. 1, with the top frame section removed, in order to display the internal workings of the invention.

DETAILED DESCRIPTION

Generally speaking, the invention relates to a mail transporting mechanism. The mechanism comprises a support means, and at least one roller assembly carried by this support. Each roller assembly is movable from a first mail engaging position to a second non-engaging mail position. These roller assemblies each support adjustment means for adjusting them to a given setting with respect to their mail engaging position. Position means is provided to move the roller assemblies from their first mail engaging position to their second non-engaging mail position.

Figure 1:
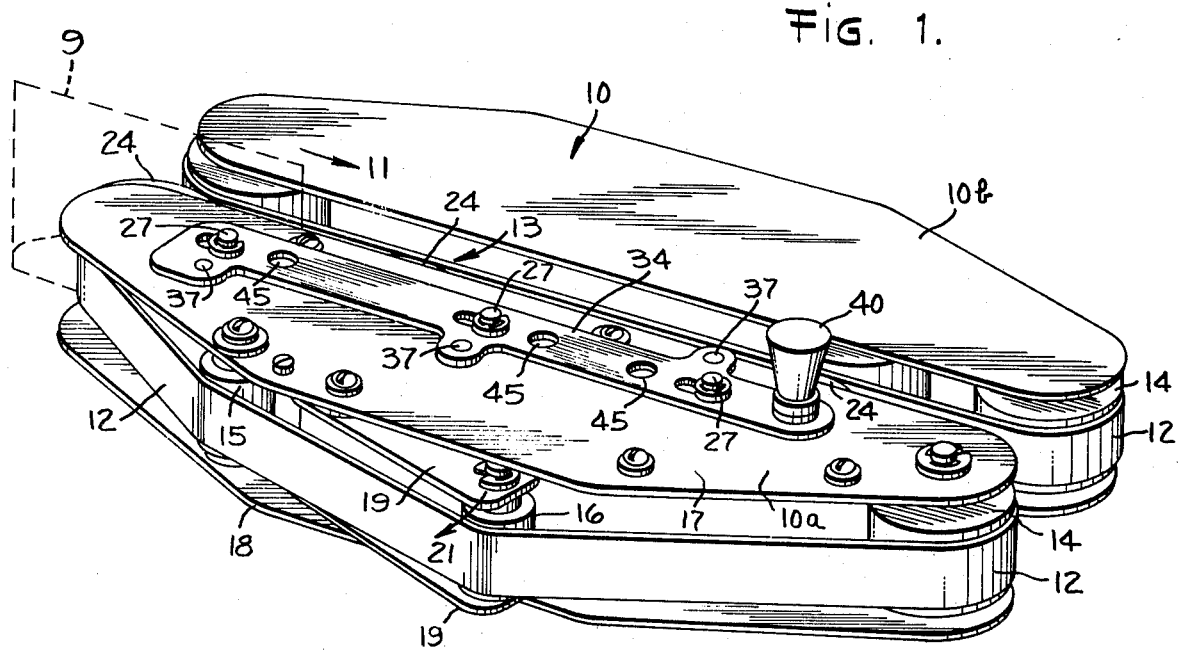
FIG. 1 shows a perspective view of the mail transporting mechanism of this invention.

Now referring to FIG 1, an envelope 9 is shown in phantom, as it enters (arrow 11) the mail transporting mechanism of this invention, generally depicted by arrow 10. The mail transporting mechansim comprises two transporting sections 10a and 10b. Both sections 10a and 10b may be identically constructed, wherein each section comprises movable roller assemblies 13, or one section may have fixed roller assemblies, while only its mating section has movably roller assemblies (see FIGS. 5 and 6). At least one section must provide movable rollers so as to yield to, and accommodate various thicknesses of mail. As aforementioned, one section may have fixed rollers, in order to provide a guide surface to the incoming pieces of mail.

Figure 2:
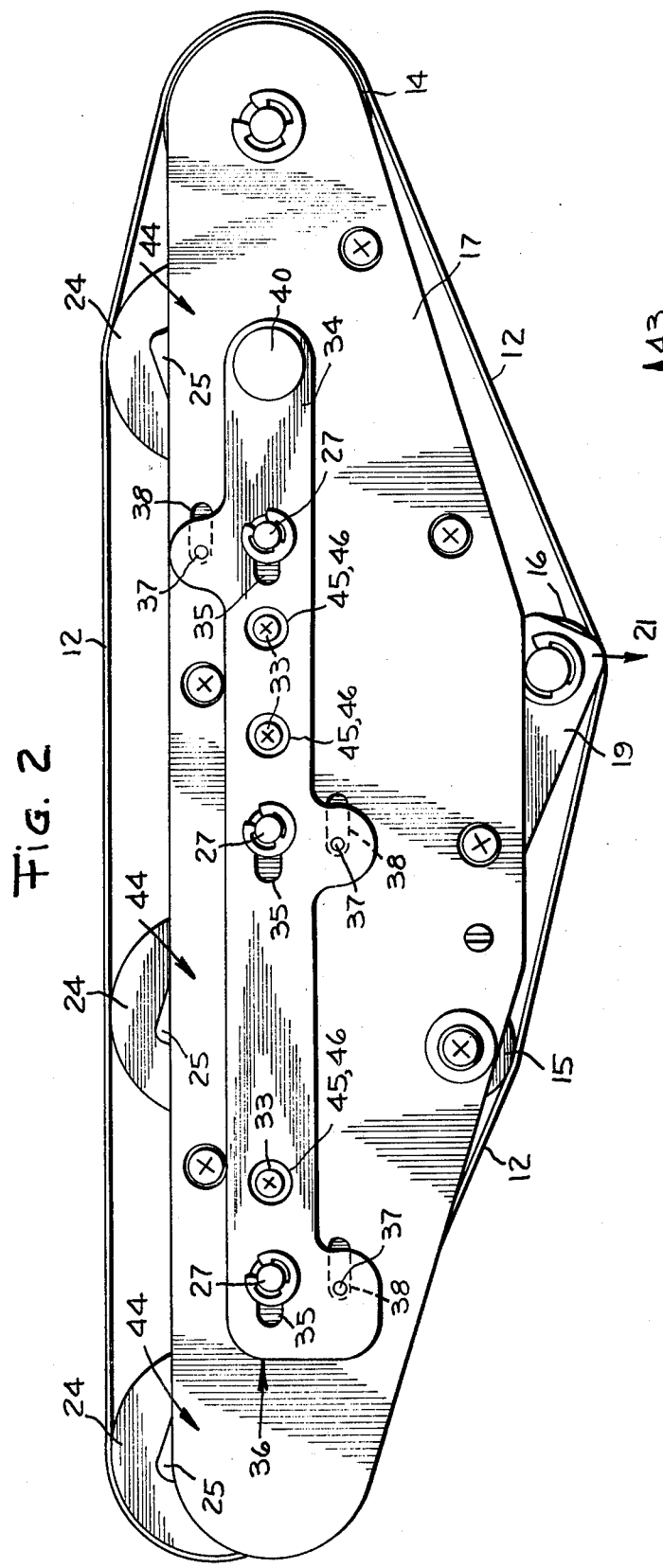
FIG. 2 depicts a top view of the inventive mail transporting mechanism of FIG 1 in a mail engaging position.

Each transport section (10a/10b) has a frictional belt 12 tensioned about the roller assemblies 13, the drive roller 14, and tensioning and guide rollers 15 and 16 (also see FIGS. 2, 4 and 5). The frictional belt 12 grips the envelope. As the drive wheel 14 turns, the belt 12 pulls upon the letter 9, thus conveying it through the apparatus. Only one of the drive rollers 14 shown in FIG. 1 need be powered to drive the envelope 9 through the system. In other words, one section 10a or 10b need not be powered in order to convey the mail. The drive rollers 14 are powered by a motor (not shown) or other appropriate means.

Guide roller 15 provides a proper angle for belt 12 so that it does not rub against, or otherwise conflict with the frame members 17 and 18. Roller 16 provides tensioning for the belt 12. Roller 16 is rotatively mounted on one end of yoke member 19. Yoke member 19 is pivotably mounted upon shaft 20 (FIG. 5). The yoke member 19 is biased outwardly (arrow 21) via spring 22, which is disposed between the yoke member 19 and a fixed collar member 23 (see FIG. 5). The outward bias of the yoke and roller 16 provides the tension upon belt 16.

Figure 6:
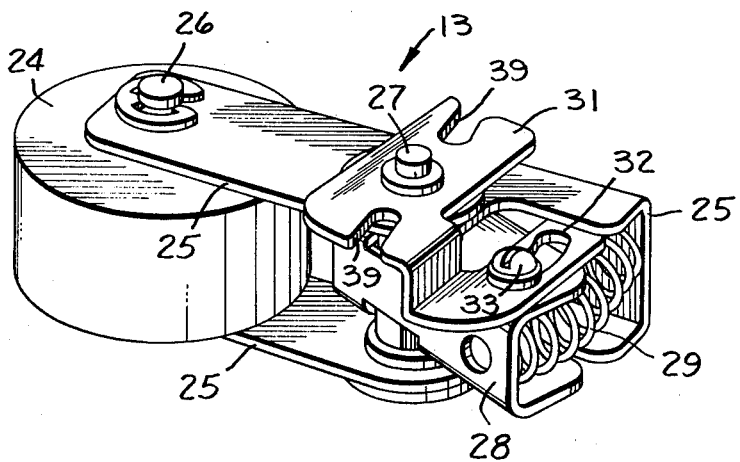
FIG. 6 illustrates a perspective view of a roller assembly of the invention as shown in FIG. 5.

Roller assemblies 13 (FIGS. 5 and 6) are comprised of a roller 24 which is rotatively mounted on yoke member 25 via shaft 26. The yoke member 25 is pivotably mounted between frame support members 17 and 18 (FIG. 3) via shaft 27. A fixed collar member 28 is mounted about shaft 27, which has a "D" — shaft configuration (FIG. 6) across its mid-section. This "D" — shaft configuration prevents collar member 28 from rotating with respect to the frame supports. A spring 29 is disposed between the collar member 28 and the yoke member 25. The spring 29 biases the yoke member 25 outwardly from the frame as shown by arrow 30 in FIG. 5. The yoke members 25 are limited in their pivotal travel due to their abutting against stopping surface 47 located on each of the respective collar members 28. This outward biasing causes the belt 12 to be in firm contact with rollers 24, and also causes the belts 12 to contact each other in the initial rest position. An incoming piece of mail 9, spreads the belts 12 apart. The biasing force provided by spring 29 provides the frictional force imparted by the belt 12 to convey the letter through the mechanism. A bracket 31 is pivotably mounted upon shaft 27. The bracket 31 is affixed to collar member 28 via arcuate slot 32 and set screw 33 (FIGS. 5 and 6). The slot 32 is curved and elongated to allow the yoke member 25 to be pivotably set in various positions with respect to collar member 28 and frame supports 17 and 18. This is for the purpose of aligning all the roller assemblies 13 at the same initial mail engaging position, i.e., all the rollers will be in a straight horizontal line in the rest position. The set screws 33 are easily accessible, so that the adjustment to the roller assembly can be made without having to disassemble any parts, as will be described hereinafter.

A slide bar 34 is slidably mounted upon frame member 17 as shown in FIGS. 1, 2 and 4. The slide bar 34 has slots 35, which enable the bar to slide past shafts 27 as shown by arrow 36 in FIG. 2. The slots 35 are a given length and size to guide and limit the travel of the slide bar. There are three pins 37 located upon bar 34, which extend through slots 38 in frame 17, and fit within one of the camming slots 39 in each of the respective brackets 31 (see FIGS. 2 through 5). The brackets 31 have two camming slots 39, so that the roller assemblies 13 can be mounted in reverse position, e.g. the right hand assembly in FIG. 5 is mounted in opposite relationship to the other two roller assemblies.

The slide bar 34 has a knob 40 at its right hand end. Knob 40 controls a spring-loaded anchor pin 41 (FIG. 3) which rests in aperture 42 of frame member 17. When the slide bar is to be moved to the right as shown by arrow 36 (FIGS. 2 and 3), the pin is pulled upwardly (arrow 43) against the pin spring (not shown), thus lifting the anchor pin 41 out of hole 42. This frees the slide bar 34, so that it may now be pulled across the frame (arrow 36).

When the slide bar 34 is pulled to the right, the camming pins 37 carried by the slide bar are caused to move against their respective brackets 31. This results in pivoting each of the roller assemblies away from the belt 12 as shown by arrows 44 in FIG. 2. The roller assemblies 13 are caused to pivot because the pins 37 pivotably cam the brackets 31 about their respective shafts 27.

Since the brackets 31 are each secured to a respective yoke member 25, each respective roller assembly is caused to pivot about its shaft 27. This results in moving the rollers 24 from their positions in FIG 2, to the positions shown in FIG. 4.

The pivoting of the roller assemblies to a non-engaging position provides the capability of releasing jammed envelopes 9 from between the belts 12 (FIG. 1). It also provides a convenient way to remove a worn or damaged belt 12, without having to disassemble the mechanism.

As aforementioned, the alignment of the rollers 24 in the initial mail engaging position is provided by adjusting the respective bracket 31 positions with respect to collar members 28. This is accomplished by tightening each set screw 33 at a desired position within its arcuate slot 32. Because each roller assembly will naturally be manufactured with varying dimensions within certain tolerances, the set screw 33 and slot 32 provide a convenient way of compensating for these dimensional inaccuracies. In other words, greater tolerances can be used in the manufacture of the roller assemblies, and a satisfactory fit will be obtained.

Figure 3:
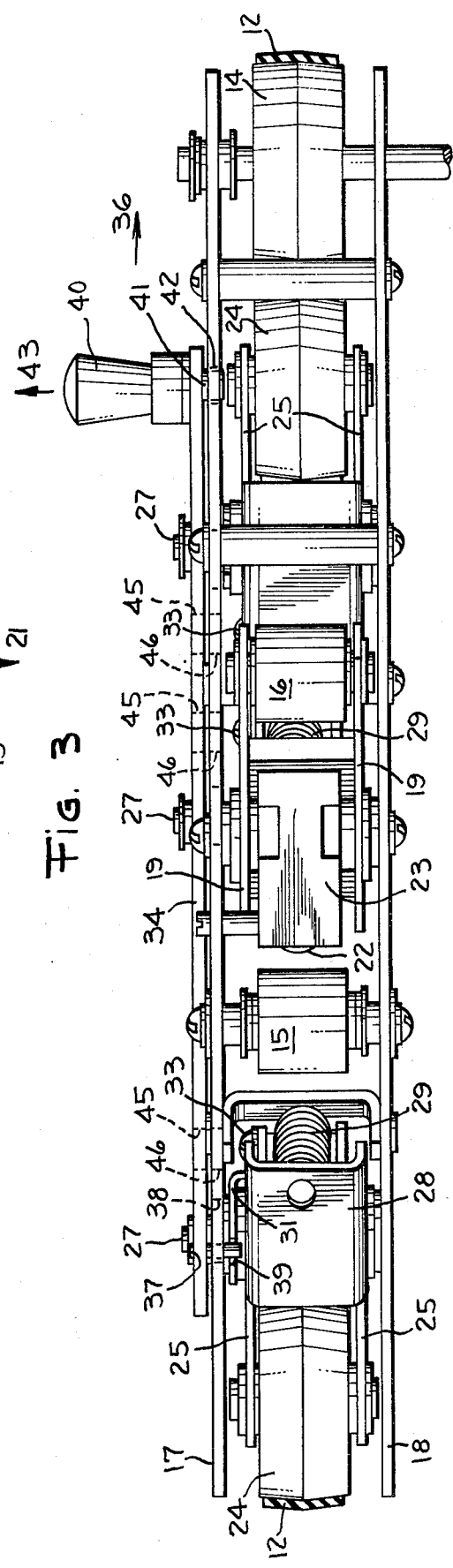
FIG. 3 illustrates a side view of the inventive mail transporting mechanism of FIG. 2.

The set screws 33 are easily accessed by means of a screw driver thrust through holes 45 in the slide bar 34, and the aligning apertures 46 in the supporting frame 17 (see FIG. 3). It should be noted, however, that holes 45 and 46 only align with each other when the roller assemblies 13 are in the mail engaging position (compare FIGS. 2 and 4).

Naturally many modifications and changes will occur to those skilled in this art. All obvious alterations and changes are deemed to lie within the spirit and scope of this invention as presented by the appended claims.

What is claimed is:

1. An adjustable mail transporting mechanism for conveying pieces of mail of different thicknesses, comprising:

a plurality of rotative mail transporting roller assemblies;

support means carrying said rotative transporting roller assemblies, each of said roller assemblies comprising a yoke member carrying a mail transporting roller, said yoke member rotatively supporting said roller at one end thereof, and being pivotably supported by said support means at an opposite end thereof;

bias means operatively engaged to each of said yoke members of said roller assemblies for biasing said yoke members with respect to said support means and consequently biasing each of said rollers towards a mail engaging position; and release means carried by said support means and operatively engageable with each of said yoke members of said roller assemblies for pivoting each yoke member and hence, each roller assembly, with respect to said support means from a first mail engaging roller position to a second mail non-engaging roller position, said roller assemblies being otherwise automatically adjustable between said first and second positions to accommodate different thicknesses of mail.

2. The mail transporting mechanism of claim 1, further comprising a transfer belt supported by the mail transporting rollers.

3. The mail transporting mechanism of claim 1, wherein each yoke member carries a support collar, and wherein the bias means comprises a spring disposed between the support collar and the yoke member, each yoke member, spring, and support collar forming a pivotable roller assembly.

4. The mail transporting mechanism of claim 3, wherein the release means comprises a slide bar having a number of pins, one pin for each pivotable roller assembly, each pivotable roller assembly further comprising a bracket adjustably connectable to said support collar and having an aperture for receiving a pin of said slide bar.

5. The mail transporting mechanism of claim 4, wherein each of said brackets contains a slot and is connected to said support collar via a set screw running through the slot in the bracket into said support collar.

6. The mail transporting mechanism of claim 5, wherein each roller assembly is pivotable about a shaft supported by said support means, whereby the mail engaging roller position is adjustable with respect to the support means by means of pivoting said roller assembly upon said shaft, and further wherein said mail engaging roller position is affixed by means of tightening said set screw so that said bracket is secured to said support collar.

7. An adjustable mail transporting mechanism for transporting pieces of mail having different thicknesses and traveling with a vertical orientation, comprising:
support means;
at least one roller assembly carried by said support means, each roller assembly having a roller rotatively mounted on one end thereof for engaging mail, each roller assembly being pivotably mounted upon said support means about an end opposite said roller end, each said assembly containing a pivot bracket for changing a given pivot position of said assembly with respect to said support means; and release means comprising a slide bar which is engageable with each bracket and supported by said support means, said slide bar containnng pins which are operatively engageable with each bracket to pivot said roller assembly from a first mail engaging position to a second mail non-engaging position about said support means each of said roller assemblies being automatically adjustable between said first and second positions to accommodate different thicknesses of mail.

8. The mail transporting mechanism of claim 7, wherein said pivot bracket is adjustably mountable to said roller assembly about one end thereof, and is pivotably mounted to said support means about an opposite end thereof.

9. The mail transporting mechanism of claim 7, wherein each pivot bracket contains a curved slot for adjustably securing said bracket to said roller assembly, whereby the first mail engaging position of the roller assembly can be adjusted to a given setting.

* * * * *